United States Patent [19]

Fisch

[11] Patent Number: 5,337,089
[45] Date of Patent: Aug. 9, 1994

[54] APPARATUS FOR CONVERTING A DIGITAL VIDEO SIGNAL WHICH CORRESPONDS TO A FIRST SCAN LINE FORMAT INTO A DIGITAL VIDEO SIGNAL WHICH CORRESPONDS TO A DIFFERENT SCAN

[75] Inventor: Eberhard Fisch, Yonkers, N.Y.

[73] Assignee: Philips Electronics North America Corporation, New York, N.Y.

[21] Appl. No.: 73,402

[22] Filed: Jun. 7, 1993

[51] Int. Cl.⁵ .............................................. H04N 7/01
[52] U.S. Cl. ................................... 348/446; 348/448; 348/450
[58] Field of Search ............... 358/140, 160, 148, 141, 358/11; H04N 7/01

[56] References Cited

U.S. PATENT DOCUMENTS 4,623,922 11/1986 Wischermann ....................... 358/160
4,660,081 4/1987 Heerah ................................ 358/160
4,707,742 11/1987 Field et al. ........................ 358/160 X
5,233,427 8/1993 Christopher ..................... 358/140 X Primary Examiner—Victor R. Kostak
Attorney, Agent, or Firm—Leroy Eason

[57] ABSTRACT

Apparatus for converting a digital video signal between two different formats, such as interlaced field and non-interlaced progressive frame, and which avoids filtering and sub-sampling of portions of the video data which are the same in either format. For conversion from interlaced field to progressive frame, only alternate fields of the signal are subjected to digital filtering. The filtered fields are then combined with the non-filtered fields, which are subjected only to an equivalent delay, to derive averaged frames which constitute a progressive frame video signal. For the reverse conversion, alternate scan lines of each frame are sub-sampled and averaged to derive a field which is then interlaced with a field formed by the remaining scan lines of such frame, thereby deriving an interlaced field video signal.

6 Claims, 7 Drawing Sheets

| INPUT FIELD | S1 S2 | S3 | S4 | FIELD STORE WRITE | FIELD STORE READ | S4 OUTPUT |
|---|---|---|---|---|---|---|
| x(1, k) | 1 | 1 | 1 | $y_0(1,p)/2$ | $y_0(0,p)$ | $y_0(0,p)+y_1(1,p)/2$ (TRANSIENT RESPONSE) |
| x(2, k) | 0 | 0 | 0 | $y_0(1,p)/2+y_0(2,p)$ | $y_0(1,p)/2$ | NO DATA |
| x(3, p) | 1 | 1 | 1 | $y_0(3,p)/2$ | $y_0(1,p)/2+y_0(2,p)/4$ | $y_0(1,p)/2+y_0(2,p)+y_0(3,p)/2$ |
| x(4, k) | 0 | 0 | 0 | $y_0(3,p)/2+y_0(4,p)$ | $y_0(3,p)/2$ | NO DATA |
| x(5, k) | 1 | 1 | 1 | $y_0(5,p)/2$ | $y_0(3,p)/2+y_0(4,p)$ | $y_0(3,p)/2+y_0(4,p)+y_0(5,p)/2$ |
| x(6, k) | 0 | 0 | 0 | $y_0(5,p)/2+y_0(6,p)$ | $y_0(5,p)/2$ | NO DATA |
| x(7, k) | 1 | 1 | 1 | $y_0(7,p)/2$ | $y_0(5,p)/2+y_0(6,p)$ | $y_0(5,p)/2+y_0(6,p)+y_0(7,p)/2$ |

FIG. 6

| INPUT FIELD | FIELD STORE WRITE | FIELD STORE READ | OUTPUT FIELDS |
|---|---|---|---|
| z(0, p) | g(1, p) | 0 | 0 (TRANSIENT RESPONSE) z(0, p) |
| z(2, p) | g(3, p) | g(1, p) | g(1, p)+g(3, p) z(2, p) |
| z(4, p) | g(5, p) | g(3, p) | g(3, p)+g(5, p) z(4, p) |
| z(6, p) | g(7, p) | g(5, p) | g(5, p)+g(7, p) z(6, p) |

FIG. 9

APPARATUS FOR CONVERTING A DIGITAL VIDEO SIGNAL WHICH CORRESPONDS TO A FIRST SCAN LINE FORMAT INTO A DIGITAL VIDEO SIGNAL WHICH CORRESPONDS TO A DIFFERENT SCAN

BACKGROUND OF THE INVENTION

1. Field of the Invention

The present invention relates to conversion of the scan line format of a digital video signal, for example as between a format of sequential frames, each frame being a pair of interlaced video fields, and a format of non-interlaced (or "progressive") video frames. The invention is of particular utility for conversion as between the presently contemplated HDTV format of 1050 scan lines per frame of paired interlaced fields at a field frequency of 60 Hz, and a progressive frame format of 525 scan lines per frame at a frame frequency of 30 Hz.

2. Description of the Related Art

There are various situations in which it is necessary to change the scan line format of a video signal. It may be sought to increase the apparent definition of the image, which necessitates increasing the number of scan lines. Conversely, it may be necessary to reduce the number of scan lines in order to limit the signal bandwidth to that of the transmission channel over which the video signal is to be transmitted to a receiver. A more recent situation requiring scan line conversion relates to HDTV signal transmission, since the HDTV format does not match that of a standard NTSC signal and so must be converted in order to be capable of reception by existing television receivers. This, in turn, means that an HDTV receiver must include a decoder for re-converting the received video signal back to the HDTV format.

It is expected that the HDTV system will be digital; i.e., the transmitted video signal will be in the form of data code words which signify luminance and chrominance of each of the pixels in the video image. Scan line format conversion will therefore require anti-aliasing filtering, subsampling and interpolation, which operations inevitably introduce temporal artifacts in the video image. It would therefore be advantageous to limit such operations to only so much of the video signal data as is absolutely necessary in order to achieve the necessary format conversion, and to minimize processing of the remaining data. This will also have the advantage of permitting considerable simplification of the format conversion apparatus.

SUMMARY OF THE INVENTION

The present invention provides apparatus for conversion of the scan line format of a received digital video signal, and which minimizes processing of received signal data which is discarded by the format conversion and data which is retained substantially unaltered in the format converted video signal which is to be produced. Thus, only so much of the received signal data is subjected to digital processing as is absolutely necessary in order to achieve the desired format conversion.

Such a converter may be either an encoder or decoder, an encoder being for conversion from an interlaced field format at a relatively high field frequency to a progressive frame format at a relatively low frame frequency, each frame corresponding to a pair of the original fields. A decoder performs conversion from the progressive frame to the interlaced field format.

When in the form of an encoder, the converter has an input terminal for receiving a digital video signal representing successive fields of a video image. The received signal is alternately multiplexed to each of a pair of outputs of a multiplexer operating at the field frequency rate, so that even-numbered fields are transmitted to a first transmission path coupled to the first output and odd-numbered fields are transmitted to a second transmission path coupled to the second output. One of the transmission paths, for example the first, includes delay means for subjecting each even-numbered field to a delay corresponding to a number of scan lines and a multiplier for introducing a multiplication factor of $\frac{1}{2}$. The other transmission path, in this example the second, includes a lowpass vertical digital filter which introduces a vertically interpolated scan line between each pair of successive scan lines of each odd-numbered video field. No such vertical interpolation is provided in the first transmission path for the even-numbered fields. The interpolated odd-numbered fields and delayed even-numbered fields are alternately multiplexed to respective outputs of a second multiplexer also operating at the field rate. The encoder further comprises a field store capable of storing the pixel data of a complete video field, the write input of the store being multiplexed by a third multiplexer, also operating at the field rate, to the output of the second multiplexer and to the output of an adder which has an input coupled to a read-out terminal of store. Another input of the adder is coupled to the output of the second multiplexer. The field store operates as an accumulator, data already stored therein being read-out when new data is received for writing therein. A store-and-read loop is thereby formed such that the pixel data of each odd-numbered field is combined with the pixel data of the two preceding even and odd-numbered fields, thereby producing at the output of the adder during each odd-numbered field an averaged frame having scan lines which are an average of the scan lines of such odd-numbered field and of those of the two preceding fields. Such averaged frame constitutes a frame of a converted video signal having a progressive frame format. The successive frames thereof are produced only during the odd-numbered fields of the received video signal, thus achieving frequency reduction.

When in the form of a decoder, the converter has an input terminal for receiving a digital video signal having a progressive frame format, and an output terminal at which it produces an interlaced field format digital video signal, each pair of interlaced fields corresponding to a frame of the received digital signal. A pair of transmission paths are connected to the input terminal, the outputs of both paths being connected to respective inputs of a multiplexer operating at the field frequency, so that the outputs of both paths are alternately multiplexed to an output terminal of the multiplexer during alternate fields. A first of the transmission paths includes delay means providing a delay of approximately one field period, so that the successive frames of the received video signal are provided by the first transmission path as so delayed at the output terminal of the multiplexer. Those frames constitute alternate fields, for example the even-numbered fields, of the converted video signal at the output of the converter. The second of the transmission paths includes a lowpass vertical digital filter which filters each frame of the received video signal in the vertical direction so as to derive only alternate scan lines thereof, and field store means for combining each pair of vertically filtered frames. Each such pair of combined filtered frames constitutes an odd-numbered field of the converted video signal, and is multiplexed to the output at the multiplexer alternately with the even-numbered fields from the first transmission path. The complete converted interlaced video signal is thereby available at the output of the multiplexer.

BRIEF DESCRIPTION OF THE DRAWINGS

The invention will be described in more detail with reference to the accompanying drawings, wherein:

FIG. 6 is a tabulation of the sequential operations performed by the various blocks of the converter in FIG. 5;

FIG. 9 is a tabulation of the sequential operations performed by the various blocks of the converter in FIG. 8.

DESCRIPTION OF THE PREFERRED EMBODIMENTS

Figure 1:
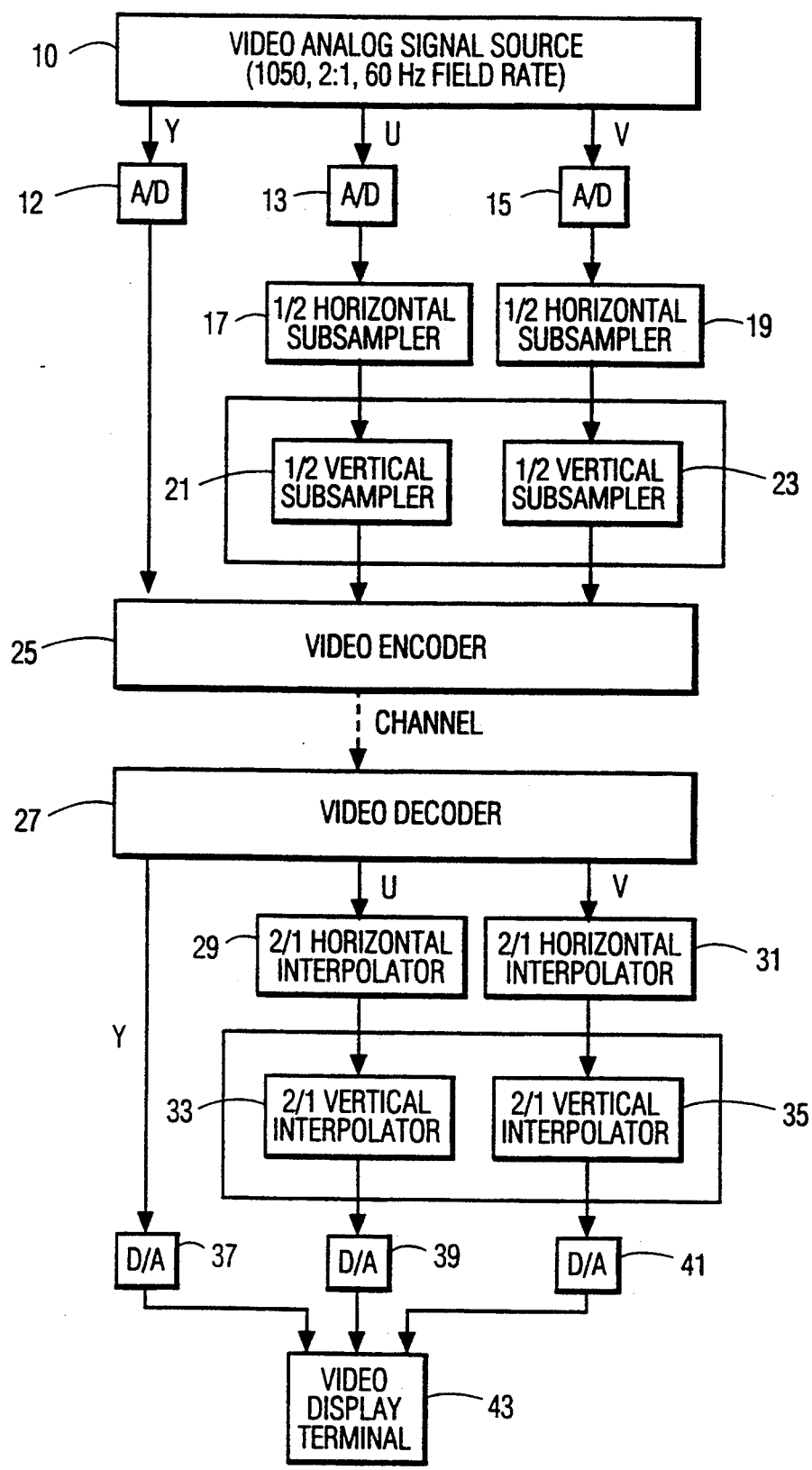
FIG. 1 is a block diagram of a conventional video transmission system wherein at the transmitter an analog video signal corresponding to a relatively high definition format of interlaced video fields is digitized and converted into a lower definition digital video signal corresponding to a progressive frame format, the converted digital signal is transmitted over a transmission channel to a receiver, and at the receiver is reconverted back to an analog video signal having the original high definition interlaced field format.

FIG. 1 is illustrative of the context in which the invention may be employed. This is a block diagram of a conventional video transmission system employing scan line subsampling at the transmitter and scan line interpolation at the receiver. A signal source 10 produces an analog video signal corresponding to a high definition scan line format of interlaced video fields. This may, for example, be the HDTV format of 1050 scan lines per frame, each frame comprising two successive interlaced fields of 525 lines, at a field repetition rate of 60 Hz. Such a video signal includes a luminance component Y and chrominance component U and V in respective frequency bands which partially overlap. The chrominance components are typically in the form of QAM (quadrature amplitude modulation) of a color subcarrier at a frequency at the upper end of the frequency band of a main carrier which is modulated by the luminance component Y. The designation of the chrominance components as "U" and "V" is in conformity with the nomenclature of the European PAL system, but they could equally well be the I and Q chrominance components of the NTSC system employed in the United States. The three video signal components are respectively digitized by A/D converters 12, 13 and 15, following which the digitized U and V chrominance signals are respectively subjected to 2:1 horizontal subsampling by subsamplers 17 and 19, respectively, followed by vertical 2:1 temporal subsampling by subsamplers 21 and 23 to provide conversion from the 60 Hz interlaced field rate to a 30 Hz progressive frame rate. The resulting U and V signals thereby each correspond to progressive subsampled frames of 525 scan lines, at the 30 Hz frame rate. The digitized luminance signal Y and the subsampled digitized chrominance U and V signals are then encoded by a video encoder 25 to form a series of data words appropriate for transmission over a transmission channel to a receiver, each data word including information specifying the luminance and chrominance of a particular pixel of the video image represented by the complete series. The transmission channel may be radio or cable, or may be a recording medium such as a video disc on which the data words are recorded for subsequent playback, in which case the receiver would be the playback apparatus.

The transmitted data words are received from the channel by a receiver which includes a video decoder 27 for decoding them back into digital Y, U and V video signals corresponding thereto. The U and V signals are respectively supplied to 2:1 horizontal interpolators 29 and 31 which derive interpolated pixel values for inclusion between each pair of pixels on each scan line of the received signal, and the horizontally interpolated U and V signals are supplied to 2:1, vertical interpolators 33 and 35 which derive, from the scan lines in the successive received frames, interlaced fields having scan lines which are interpolations of the corresponding scan lines in the received frames. The resulting series of interlaced fields have 525 scan lines at a field rate of 60 Hz, which matches the scan line format of the Y signal. The Y and interpolated U and V signals are then respectively converted back to analog form by D/A converters 37, 39 and 41, the resulting analog signals being supplied to a video display terminal 43 wherein they are demodulated and decoded to recover primary color signals for actuating a video display terminal 43.

The present invention concerns the operations performed by the vertical subsamplers 21 and 23 in the transmitter and by the vertical interpolators 33 and 35 in the receiver, which effect conversion between a higher definition format of successive interlaced fields and a lower definition format of progressive frames, the frame rate of the latter signal corresponding to the field rate of the received signal.

Figure 2A:
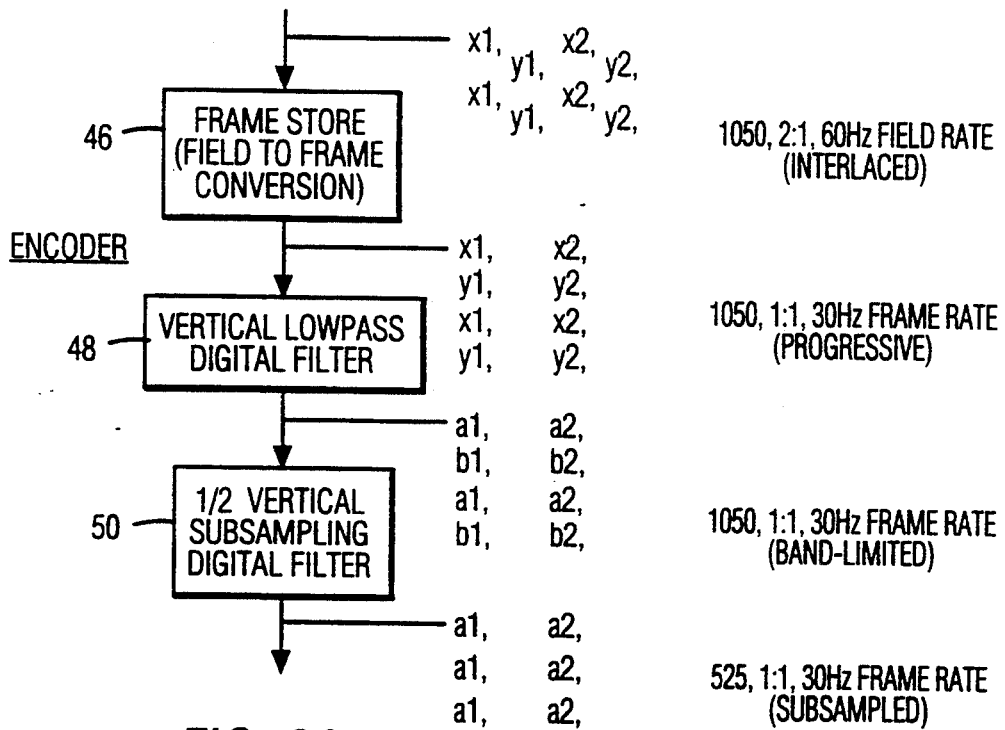
FIG. 2a is a block diagram of the portion of the transmitter in FIG. 1 which by subsampling achieves field-to-frame conversion of the transmitted signal.
Figure 2B:
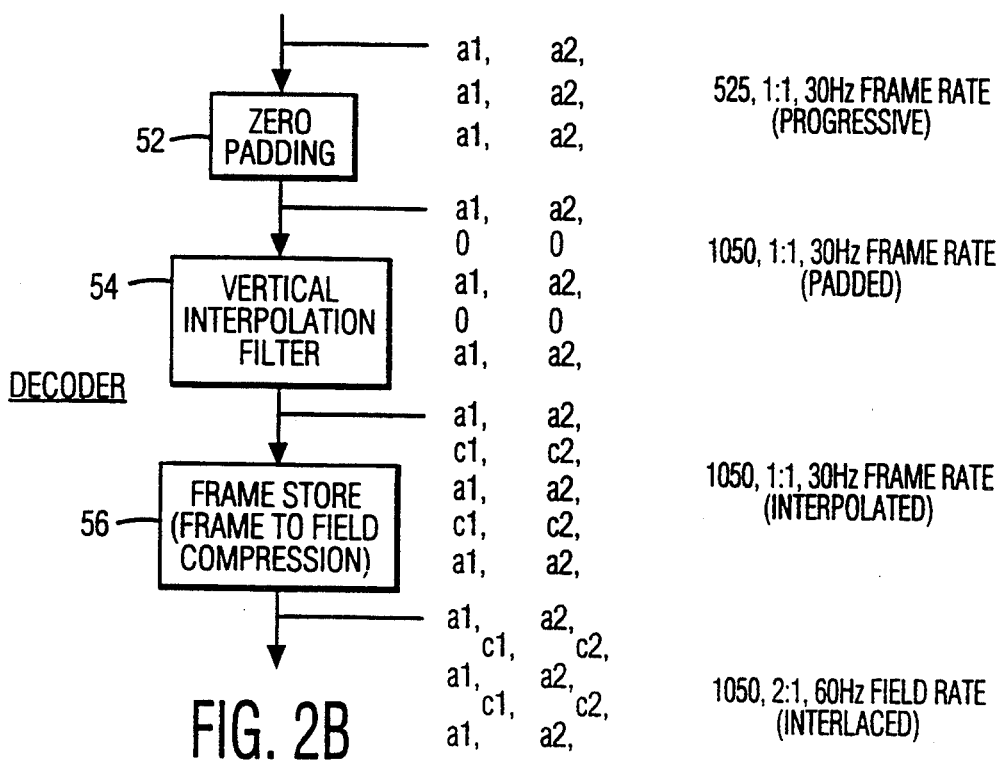
FIG. 2b is a block diagram of the portion of the receiver in FIG. 1 which performs scan line interpolation in order to return to the original high definition interlaced field format.

The sequence of operations involved in subsampling is shown in FIG. 2a, and the sequence of operations involved in interpolation is shown in FIG. 2b. In FIG. 2a, the video signal to be encoded is assumed to have the HDTV format of 1050 scan lines per frame, each frame including a pair of interlaced fields at a 60 Hz field rate. The even and odd-numbered fields are schematically designated "x" and "y" respectively, the vertical sequence of the successive scan lines thereof in a frame therefore being $x_1y_1, x_2y_2, x_3y_3, \ldots$. The scan line data of the two successive fields of each frame is accumulated during the frame period in a frame store 46, thereby achieving conversion to a progressive frame format of 1050 scan lines per frame at a frame rate of 30 Hz. The converted signal is read-out from the store to a vertical lowpass digital filter 48, which is necessary to avoid aliasing in the succeeding subsampling stage. Such filtering alters the data content of the x and y scan lines, the corresponding altered even and odd numbered scan lines of successive frames being schematically designated $a_1b_1, a_2,b_2, a_3,b_3 \ldots$, but does not alter the number of scan lines per frame or the frame rate. The subsampler 50 performs a 2:1 subsampling of the scan lines in each frame, selecting the even-numbered scan lines $a_1, a_2, a_3, \ldots$, and discarding the odd-numbered lines $b_1, b_2, b_3, \ldots$. This results in an output signal having a progressive frame sequence of 525 scan lines $a_1, a_2, a_3, \ldots$, at the 30 Hz subsampled frame rate. Such a signal is produced by each of the subsamplers 21 and 23 in the transmitter in FIG. 1.

In the decoder in FIG. 2b, interpolation is performed on a received progressive frame digital signal such as the aforesaid 525 line, 1:1, 30 Hz progressive frame signal, in order to decode it back to the original higher definition interlaced field signal from which it was derived, in this example, a 1050, 2:1 interlaced, 60 Hz field rate signal. Zero padding block 52 is a pulse generator which inserts zero data scan lines between the successive scan lines $a_1, a_2, a_3$ of each successive frame of the received signal. A vertical interpolation digital filter 54 inserts, derived from the data of the received scan lines, interpolated data designated "c" on the zero scan lines. The resulting scan line sequence is then $a_1c_1, a_2c_2, a_3c_3 \ldots$, in successive frames at a 30 Hz frame rate. The output of filter 54 is supplied to a frame store 56 which assigns alternate scan lines of each video frame to respective video fields which are alternately read-out from the store, thereby achieving the desired format of 1050 scan lines in 2 interlaced fields per frame at a 60 Hz field rate. The interpolated scan lines have been designated "c" rather than "b" as in FIG. 2a, because it is never possible to exactly re-create by interpolation the actual scan lines which had been discarded by the subsampling performed at the transmitter. This inevitably results in artifacts in the image produced at the receiver.

Figure 3:
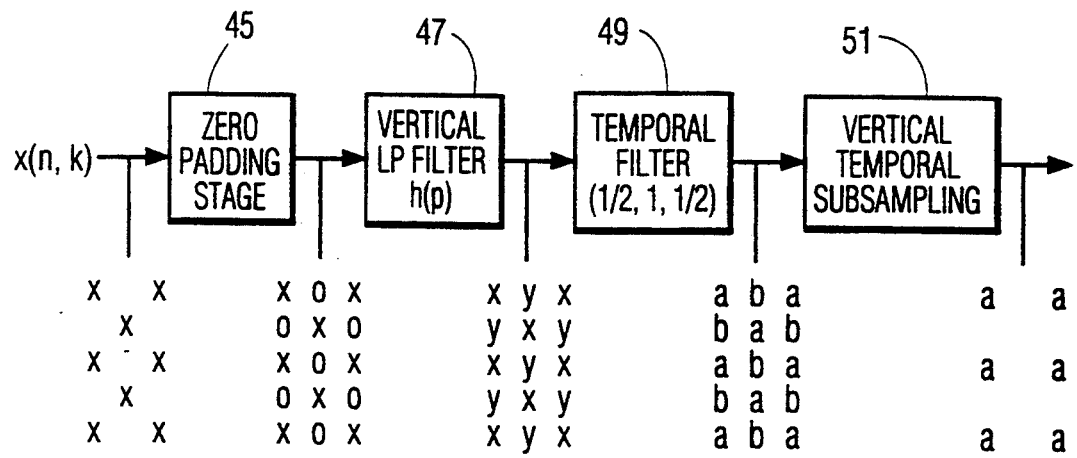
FIG. 3 is a block diagram showing the conceptual video processing steps which are involved in a scan line format converter in accordance with the invention for encoding a higher definition interlaced field format to a lower definition progressive frame format.

Referring now to FIG. 3, this shows the conceptual processing operations involved in a scan line converter in accordance with the invention, the converter here being an encoder for achieving format conversion as in FIG. 2a. The digital input signal x(n, k) signifies successive scan lines k of each of successive interlaced video fields n. The scan line format of each field is schematically indicated by "x" vertically successive scan lines, those in each succeeding field being vertically displaced by a distance of one scan line relative to the preceding field. The zero-padding stage 45 inserts zero-data scan lines between the received successive scan lines of each field, thereby effectively doubling the number of lines per field. The resulting scan line format is then as schematically shown at the output of stage 45. The padded fields are then subjected to lowpass filtering in the vertical (line-to-line) direction by a digital filter 47 having an impulse response characteristic h (p), as a consequence of which the zero scan lines are provided with data and so become scan lines schematically designated "y". The resulting field sequence is then as shown at the output of filter 47. The field data is then passed to a temporal lowpass digital filter 49 having successive coefficients in the proportions $\frac{1}{2}$, 1 and $\frac{1}{2}$, whereby each scan line is effectively converted to a scan line corresponding to the average of that line and the two adjoining scan lines. In the resulting sequence of fields at the output of filter 49, the successive scan lines in each field are denoted by the letters "a" and "b" to signify that they have been altered from the "x" and "y" scan lines which previously existed. The final operation is vertical subsampling (or decimation) in block 51, which discards alternate fields and also discards alternate scan lines in the remaining fields. The resulting scan line format at the output of subsampler 51 therefore consists of only the "a" scan lines and only in alternate fields, thus constituting an output digital signal such as that at the output of block 50 in FIG. 2a.

Figure 4:
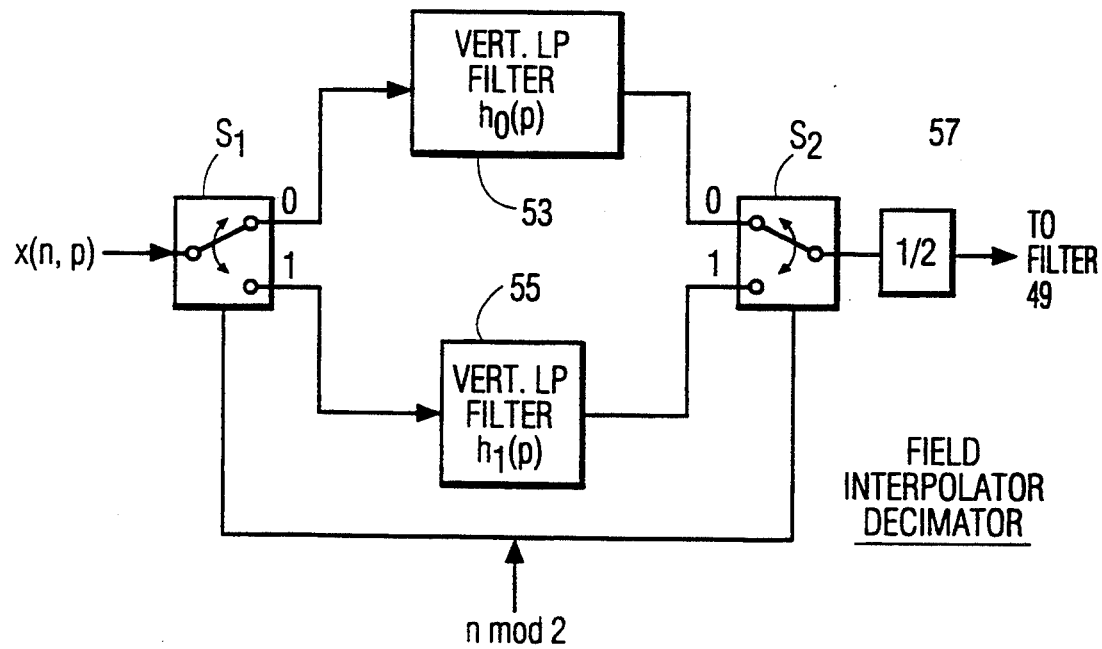
FIG. 4 is a block diagram of a portion of a scan line converter in accordance with the invention for performing the equivalent of the zero padding and lowpass filtering operations in FIG. 3, such portion constituting a field interpolator-decimator.

Applicant has recognized that since the zero padding stage 50 and filter 47 result in interpolated scan lines "y" which after filtering are then discarded in the subsequent subsampling operation, there really is no reason to have had to compute such interpolated scan lines in the first place. Accordingly, in accordance with the present invention, the zero padding stage 45 and vertical lowpass filter 47 in FIG. 3 can be replaced by a combined field interpolator-decimator arrangement as shown in FIG. 4. Therein the input digital signal x(n, p), n being the field number and p the line number, is received at the input terminal of a multiplexer $S_1$ having a pair of output terminals between which the input is switched at the field rate. For that purpose, multiplexer $S_1$ may be actuated by a logic signal n mod 2 supplied thereto, so that even-numbered fields are supplied to output terminal "0" of multiplexer $S_1$ and odd-numbered fields are supplied to output terminal "1" thereof. Such terminals are respectively connected to a pair of transmission paths, the path connected to the even terminal "0" comprising a vertical low pass digital lowpass filter 53 having an impulse response characteristic $h_0(p)$, and the path connected to the odd terminal "1" comprising a vertical lowpass digital filter 55 having an impulse response characteristic $h_1(p)$, in accordance with $$h_0(p) = \tfrac{1}{2} \cdot h(2p), \text{ and}$$

$$h_1(p) = h(2p+1).$$

That is, filter 53 can be simply the even taps of a lowpass filter such as filter 47 in FIG. 3, followed by a $\frac{1}{2}$ multiplier. However, filter 53 can even more simply be a delay unit providing a one line delay, again followed by a $\frac{1}{2}$ multiplier. The filter 55 can be realized as the odd taps of a lowpass filter such as filter 47 in FIG. 3, and having a gain factor of $\frac{1}{2}$. Thus, even-numbered input fields are not filtered at all but are only delayed and multiplied by a factor of $\frac{1}{2}$. Only the odd-numbered fields are digitally filtered, and also multiplied by a filter gain factor of ½. The so-processed fields are then returned to their original sequential order by a second multiplexer $S_2$ having respective inputs connected to the respective transmission paths and an output which is alternately coupled to the inputs at the field frequency in synchronism with the first multiplexer $S_1$. The circuit in FIG. 4 thus performs the operations of blocks 45 and 47 in FIG. 3, but without affecting the data content of the even-numbered fields except by a gain factor.

Figure 5:
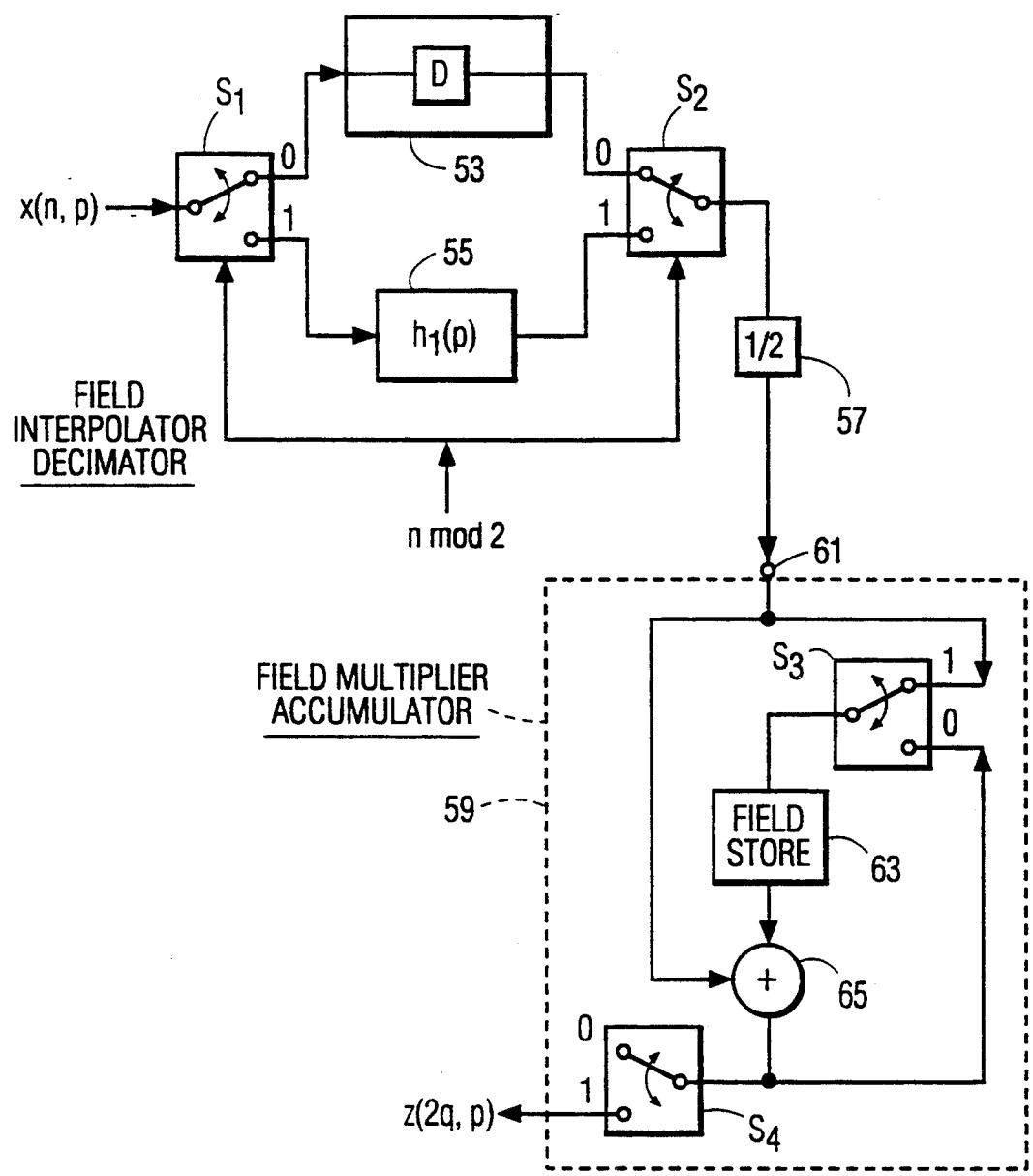
FIG. 5 is a block diagram of a complete scan line converter in accordance with the invention which performs encoding equivalent to all of the operations in FIG. 3, such converter including the field interpolator-decimator in FIG. 4 and also a field accumulator-decimator.

Applicant has further recognized that the temporal filtering provided by block 49 and the temporal subsampling provided by block 51 in FIG. 3 can together be replaced by a simple temporal filter having tap coefficients of ½, 1 and ½ for every three successive odd-even-odd fields, because since the odd-numbered fields are to be eventually discarded it is only necessary to compute the scan line data for the even-numbered output fields. This can be realized in a complete encoder as shown in FIG. 5, wherein a field store 63 serves to accumulate the scan line data of each pair of successive even and odd fields. The resultant processing then has the architecture of a temporal multiplier-accumulator, which together with a field interpolator-decimator arrangement as in FIG. 4, forms a complete encoder for performing all of the operating functions of the conceptual arrangement shown in FIG. 3. In FIG. 5 the filter 53 is simply a delay unit 53a, as noted above.

In the encoder of FIG. 5, the output of multiplexer $S_2$, which is the output of the vertical interpolator-decimator, is fed to a field multiplier-accumulator 59 by way of a multiplier 57 which provides the aforesaid ½ multiplication factor. Thus, even-numbered fields at input terminal 61 of block 59 will have been subjected to a gain factor of ½ and odd-numbered fields will have been subjected to a gain factor of ¼. Input terminal 61 is connected to one of the inputs (designated "1") of a multiplexer $S_3$ which has a second input (designated "0"), the inputs being alternately coupled to an output of the multiplexer at the field rate in synchronism with multiplexers $S_1$ and $S_2$. The output of multiplexer $S_3$ is connected to a write input of a field store 63 having a read output connected to an input of an adder 65, the adder having another input which is connected to terminal 61 and an output which is connected to the "0" input of multiplexer $S_3$. Store 63 is a high speed video memory which operates in a read-modify-write sequence. The basic operation performed by store 65 is to replace the stored value of a pixel with the sum of such value and a new incoming value thereof when multiplexer $S_3$ is set to "0". When multiplexer $S_3$ is set to "1", the stored pixel values in all memory locations are reset to the new incoming values of such pixels. By means of a multiplexer $S_4$ having an input connected to the output of adder 65 and "0" and "1" output terminals, and operating at the field rate in synchronism with multiplexers $S_1$ and $S_2$, only the accumulated pixel values obtained during even-numbered input fields or odd-numbered output fields are supplied at the "1" output of multiplexer $S_4$, thereby constituting a 30 Hz progressive frame signal which is the output of the complete converter. Since the output fields have been subjected to a delay of one field, an even-numbered output field is concurrent with an odd-numbered input field. Operation of multiplexers $S_3$ and $S_4$ at the frame rate can be achieved by actuating both with the same n mod 2 control signal used for actuating multiplexer $S_1$ and $S_2$.

Operation of the complete converter in FIG. 5 can readily be perceived from the tabulation given in FIG. 6 of the various operating states of all of the multiplexers and of field store 63. This is given for the initial seven fields following the zeroth field of the input video signal x(n, p) where p is line number. The output fields produced by the encoder are denoted z(2q,p), signifying correspondence to the even-numbered fields of the input fields q, where q=1, 2, . . . . The first four fields of the output field sequence are shown in FIG. 6.

It is assumed that the content of field store 63 is initially set to zero. During the zeroth input field (n=0 and so is an even-numbered field) all multiplexers are set at "0" and so the data of such field is produced at input terminal 61 of field multiplier-accumulator 59 and proceeds via adder 65 and the "0" terminal of multiplexer $S_3$ to be written into store 63. Although it also reaches multiplexer $S_4$ it is not output because multiplexer $S_4$ is at "0". The data of such stored field is identified as $y_0(0, p)$. During the next input field (for which n=1 and so is an odd-numbered field) a filtered field $y_0(1,p)/2$ is derived therefrom by filter 55 and is supplied to terminal 61. It proceeds to store 63 via the "0" terminal of multiplexer $S_3$ since that is set to "1", as well as to adder 65. Since multiplexer $S_3$ is at "1", store 63 reads out the data which has already been stored therein to adder 65, and so the sum thereof with the new data from terminal 61 proceeds via the "1" terminal of multiplexer $S_4$ to be output because $S_4$ is set to "1". Multiplexer $S_3$ remains in the "1" state, and so store 63 is reset to the value of the aforesaid input field $y_0(1,p)/2$.

During the next input field, which is even-numbered (n=2), the multiplexers are all returned to "0". The field $y_0(2,p)$ is supplied to adder 65, and via the "0" terminal of multiplexer $S_3$ is written into store 63. Since multiplexer $S_3$ is at "0", the already stored value $y_0(1, p)/2$ therein is replaced by $y_0(1, p)/2+y_0(2,p)$, combined thereby with the incoming value of field $y_0(3,p)/2$ at terminal 61, and the composite of all three fields is output at the "1" terminal of multiplexer $S_4$. That consists of ½ of the pixel values in each of odd fields 1 and 3 plus those of intervening even field 2, and so constitutes an averaging of the pixel values of those three successive fields. That is therefore a frame of the non-interlaced progressive frame output video signal produced by the converter. Since the converter is then back to an operating condition corresponding to that which had existed during the first even-numbered field, it will be obvious that the operation thereof for succeeding fields will simply repeat as for the sequences already described.

The result of such operations is to produce a progressive frame video signal each frame of which corresponds to an even-numbered input field, thus achieving a 2:1 reduction of the field rate to the frame rate. The pixel data of the scan lines in each output frame will correspond to an averaging of the scan line data of two odd-numbered input fields with that of the intervening even-numbered input field. An input video signal of 525 lines per interlaced field at a 60 Hz field rate will thereby be converted to an output video signal of 525 lines per progressive frame at a frame rate of 30 Hz. It is also seen that both operating time and circuitry are conserved by avoiding production of interpolated scan line data which must then subsequently be discarded, as was true of prior art scan line format converters.

Figure 7:
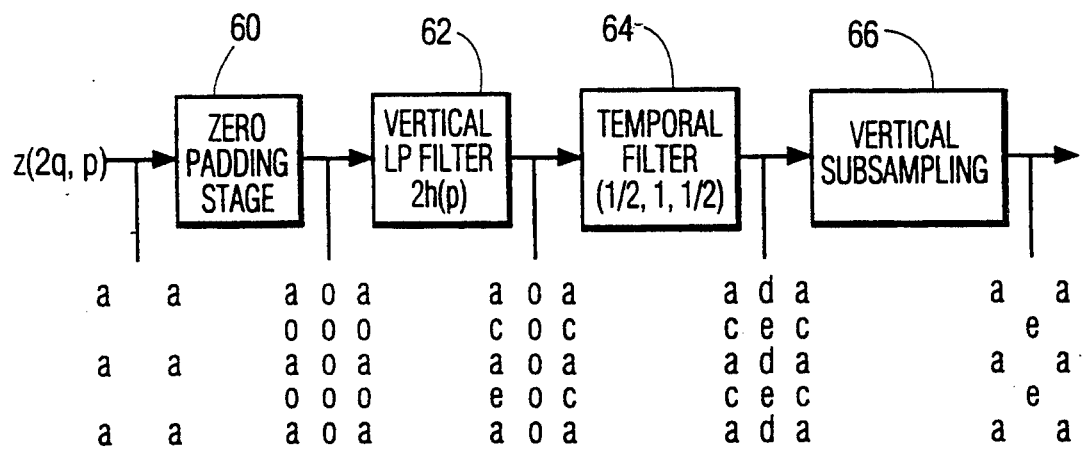
FIG. 7 is a block diagram showing the conceptual processing steps which are performed by a scan line converter in accordance with the invention for decoding a received digital signal corresponding to a lower definition progressive frame format to derive a digital signal corresponding to a higher definition interlaced field format.

Returning again to the decoder in FIG. 2b, the present invention provides an improved form of decoder apparatus which avoids unnecessary filtering of the video frames of the input video signal and so minimizes the required computations and temporal aliasing artifacts produced by a conventional frame-based decoder. A block diagram of the conceptual operations performed by Applicant's decoder apparatus is shown in FIG. 7. The input signal z(2q,p) corresponds to progressive frames, the scan line data of each frame being a combination of that of two successive fields 2q and 2q+1. The scan lines "a" are in the pattern shown at the input to a zero padding stage 60, three lines of each of two successive frames being indicated. The zero padding stage 60, like stage 45 in FIG. 3, inserts a zero data scan line between the actual scan lines in each frame and also inserts between successive frames a complete frame of zero data scan lines. This effectively converts the signal from a 525 line progressive 30 Hz frame rate to a 1050 line progressive 60 Hz field format. The resulting field sequence is as shown at the output of stage 60. The signal is then filtered in the vertical direction (line-by-line) by a low pass digital filter 62, thereby providing each of the zero scan lines with data interpolated from the adjoining actual received scan lines. The resulting field sequence is as shown at the output of filter 62, the interpolated scan lines being designated "c". The signal is next subjected to temporal filtering (field-by-field) by a low pass filter 64 having tap coefficients in the proportions ½, 1, ½, thereby deriving scan lines for each odd-numbered field having which is interpolated from the corresponding scan lines of the adjoining even-numbered fields. The resulting field sequence is then as shown at the output of filter 64, the "d" scan lines being those interpolated in the odd-numbered fields from the actual received scan lines "a"in even-numbered fields, and the "e" scan lines being those interpolated in the odd-numbered fields from the interpolated scan lines "c" in the even-numbered fields. The signal format at this point, assuming that the input signal was in the 525, 1:1, 30 Hz format, would be in the 1050, 1:1, 60 Hz format. In order to convert this to the desired interlaced format, the signal is subjected to vertical (line-by-line) sub-sampling in block 66. This discards the odd-numbered scan lines "c" in the even-numbered fields and the even-numbered scan lines "d" in the odd-numbered fields. The resulting signal at the output of block 66 then has the indicated format of successive fields of "a" and "e" scan lines. The low pass vertical filter 62 may be the same as low pass vertical filter 47 in FIG. 3, but having a further gain factor of 2. Of course, this is not essential since the vertical filters in the encoder and decoder have no necessary inter-relationship.

Figure 8:
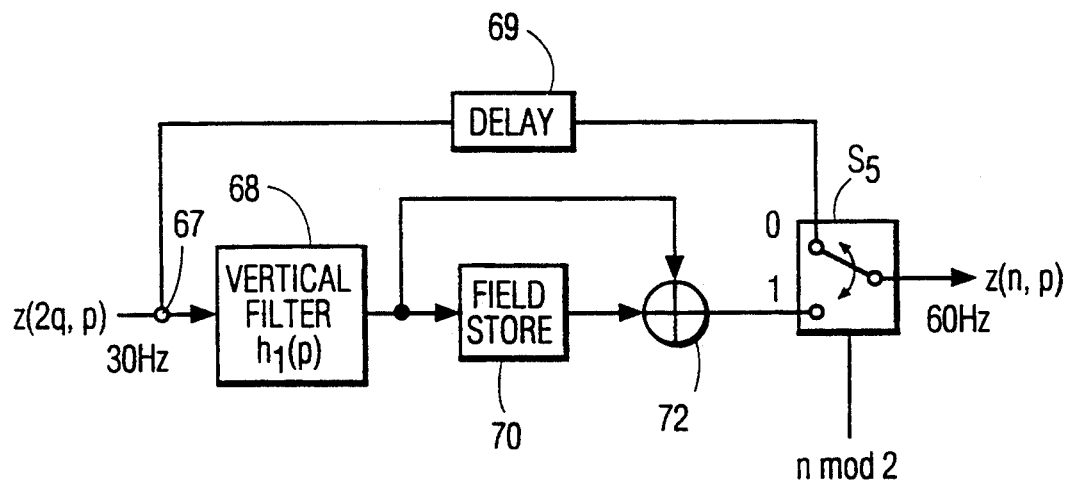
FIG. 8 is a block diagram of a scan line format converter in accordance with the invention which performs decoding equivalent to all operations in FIG. 7.

It will be noted that the processing performed in FIG. 7 derives interpolated scan lines "d" which are subsequently discarded, and also includes in the interlaced field structure scan lines "d" which are subsequently discarded. This is avoided by the decoder circuit arrangement in accordance with the invention, as shown in FIG. 8, which is based on Applicants recognition that the even-numbered fields derived by the decoding carried out in FIG. 7 are actually the received input frames having the "a" scan lines. Only the odd-numbered fields at the output of the decoder include interpolated scan lines.

In FIG. 8 the input video progressive frame signal z(2q,p) is received at an input terminal 67 to which two transmission paths are connected, the outputs of the two paths being connected to respective inputs of a multiplexer $S_5$. The multiplexer inputs are switched to the output thereof at the 60 Hz field rate, switching being effected by an n mod2 control signal, n being the field number. The first transmission path simply includes a delay unit 69 which equalizes the delay in the second transmission path, so that even-numbered frames of the input signal are produced at the output of multiplexer $S_5$ as they occur, unaltered but simply delayed. The second transmission path includes in series a vertical (line-by-line) low pass digital filter 68, a field store 70, and an adder 72 the output of which is the output of the second transmission path. The filter 68 has an impulse transfer characteristic $h_1(p)$ which is related to that of the filter 62 in FIG. 7. Since the latter filter provides interpolation between successive even-numbered scan lines, its impulse response characteristic $h_0(p)$ can be expressed as $$h_0(p)=h(2p),$$

where h(p) is the impulse response characteristic of a low pass filter the same as that of filter 47 in FIG. 3. The filter 62 therefore consists of the even taps of such a low pass filter and so is equivalent to a vertical delay of one scan line. The impulse response characteristic $h_1(p)$ of filter 68 is given by $$h_1(p)=h(2p+1),$$

and so consists of the odd-numbered taps of a low pass filter the same as filter 47 in FIG. 3.

By looking at the data produced at the successive blocks of the decoding process performed in FIG. 7 it can be seen that the odd-numbered output fields having the "e" scan lines can be produced by taking the average of two successive filtered input fields. That is accomplished in FIG. 8 by connecting the output of filter 68 to an input of adder 72, the other input thereof being connected to the output of field store 70. Thus, each filtered field produced by filter 68 is stored in field store 70 and then summed with the next filtered field by adder 72. Each resulting composite field is supplied to the "1" input of multiplexer $S_5$ during the interval prior to production of the next received field at the output of the delay 69, and so the sequence of fields at the output of multiplexer $S_5$ will alternately be a received field followed by an interpolated field produced by filter 68, the interpolated field being an average of that received field and the immediately preceding received field. Thus, an interlaced series of fields is produced at the output of multiplexer $S_5$ at twice the rate of the received fields.

The sequence of operation of decoder in FIG. 8 is set forth in the tabulation in FIG. 9. The relation between the input and output fields can be expressed by $$g(2q+1,p)=z(2q,p)*h_1(p)$$

giving the q-th encoder output field after it has been vertically filtered. The tabulation in FIG. 9 shows the computation of the output fields produced by the decoder. Notice that 2 output fields are produced for each input field.

The design of digital filters as specified herein will be apparent to those skilled in the art of digital signal processing, being described, for example, in Chapter 2 of the text "Digital Signal Processing" by Peled and Liu, John Wiley Inc., 1976, and in Chapter 13 of the text "Principles of Digital Audio" by Pohlmann, H. W.

Sams & Co., 2d ed. 1989. Such filters can be realized in the form of either software or hardware, conceptually being a series of taps along a time sequence of digital samples of a signal, whereby by appropriate multiplication of the tap samples and summation of the results a desired transfer characteristic can be achieved. An impulse response characteristic is the system response to a unit sample. The system response to a series of input samples is therefore the convolution of the system response and such samples. By using fractional filter coefficients, digital filtering reduces the differences between consecutive samples of a sequence. Such a reduction of differences corresponds to a lower frequency, thereby achieving low pass filtering of the series of input samples.

For clarity of description in this specification and in the ensuing claims, Applicant has referred to odd and even numbered video fields in order to identify sequentially corresponding fields in successive video frames which each comprise two video fields. It will be obvious that either field of a frame can be regarded as being odd or even, so long as consistency is maintained in referring to those which sequentially correspond in successive frames. Accordingly, identification of a field as being even or odd, in this specification and the ensuing claims, will be equally applicable thereto whether or not in any particular situation the actual location of a field in a sequence is signified by an even or an odd number in a numerical sequence.

For brevity of description, a video signal corresponding to a video field or frame has frequently been referred to herein simply as such a field or frame. It is to be understood that the present invention relates to processing of digital video signals, not video images, and so such references herein are to be understood to refer to the digital signals representing the video fields or frames in question.

Although the invention has been described principally with reference to conversion of the scan line format of chrominance components of an HDTV 2:1 interlaced 1050 lines video signal to a scan line format of progressive frames of 525 lines, and vice versa, it will be apparent that the invention is generally applicable to conversion as between any different kinds of scan line formats with accompanying conversion of the applicable field or frame rates. Other modifications and adaptations of the teachings herein will also be apparent to those skilled in the art of digital video signal processing without departing from the essential nature and scope of the invention as set forth in the ensuing claims.

What is claimed is:

1. Apparatus for converting a received digital signal representing a video image having a first scan line format into an output digital signal representing a video image having a second scan line format; the first format having a number N of scan lines per sequential frame of two successive interleaved fields, each field having a number N/2 of scan lines; the second format having progressive frames, each frame having a number N/2 scan lines, the field frequency of the first format being substantially twice the frame frequency of the second format; said apparatus having an input terminal for the received digital signal and comprising:

first multiplexing means coupled to said input terminal and having a pair of outputs which are alternately multiplexed to said input terminal during alternate fields of the received signal;

a pair of transmission paths each having an input and an output, the inputs thereof being respectively coupled to the respective outputs of said first multiplexing means so that even-numbered fields are supplied to a first of said paths and odd-numbered fields are supplied to a second of said paths;

second multiplexing means having respective inputs coupled to the outputs of said first and second paths and having an output which is alternately multiplexed to said inputs in synchronism with said first multiplexing means, so that even-numbered fields transmitted by said first transmission path and odd-numbered fields transmitted by said second transmission path are alternately produced at the output of said second multiplexing means;

delay means in said first transmission path for delaying each even-numbered field therein for substantially one field period and supplying successive delayed even-numbered fields to the output of said first transmission paths;

lowpass digital filter means in said second transmission path for vertically (line-by-line) lowpass filtering each odd-numbered field and supplying successive filtered odd-numbered fields to the output of said second transmission path; and field store means coupled to the output of said second multiplexing means for receiving the delayed even-numbered fields and the filtered odd-numbered fields, and adapted to derive therefrom subsampled fields having scan lines which each correspond to an average of a scan line of a filtered odd-numbered field and the equivalent scan lines of the adjoining even-numbered fields;

said field store means being further adapted to produce said subsampled fields at an output thereof in synchronism with the even-numbered fields of the received signal, so that said subsampled fields constitute said digital output signal.

2. Scan line format conversion apparatus as claimed in claim 1, wherein said received digital signal represents a chrominance component of a composite color television signal which includes a luminance component and a modulated color subcarrier having at least two chrominance components.

3. Scan line format conversion apparatus as claimed in claim 1, wherein said store means comprises: a field store, adding means having a first input connected to a read output of said field store and a second input connected to the output of said second multiplexing means, and third multiplexing means for multiplexing the output of said adding means and the output of said second multiplexing means to a write input of said field store; whereby even-numbered fields at the output of said second multiplexing means are conveyed via said third multiplexing means to the read input of said field store for storage therein and cause read-out therefrom to said adding means of a summation of the preceding odd and even-numbered fields, the so read-out field summation being combined by said adding means with the succeeding even-numbered field to derive a field of said digital output signal.

4. Apparatus for converting a received digital signal representing a video image having a first scan line format into an output digital signal representing a video image having a second scan line format, the first format having a number N of scan lines per progressive frame, the second format having a number 2N of scan lines per sequential frame of two successive interleaved fields, the field frequency of the second format being substantially twice the frame frequency of the first format; said apparatus having an input terminal for receiving the received digital signal and comprising:

- a pair of transmission paths each having an input and an output, the input of each path being connected to said input terminal;
- multiplexing means having a first and a second input respectively coupled to the outputs of a first and a second of said transmission paths and having an output terminal which is multiplexed at said field frequency to the first and second inputs of said multiplexing means, said output terminal being an output terminal of said converter;
- delay means in said first transmission path for equalizing a delay produced in said second transmission path, so that each delayed field is supplied from said first transmission path to said first input terminal of said multiplexing means while said first input terminal is multiplexed to said output terminal;
- lowpass digital filter means in said second transmission path for lowpass filtering each field of the received digital signal so as to subsample only alternate scan lines thereof; and
- field store means in said second transmission path in series with said filter means and having an output connected to the second input of said multiplexing means, said field store means being adapted to combine each successive pair of subsampled fields produced by said filter means to derive a combined field having scan lines which are an average of the equivalent scan lines of said pair of fields, each combined field being produced at said second input of said multiplexing means while said second input is multiplexed to said output terminal;
- whereby the fields successively produced at said output terminal constitute the interleaved fields of said output digital signal.

5. Scan line format conversion apparatus as claimed in claim 4, wherein said field store means comprises a field store in series with digital adding means, an output of said filter means being coupled to an input of said field store and also to an input of said adding means, an output of said field store being coupled to another input of said adding means, an output of said adding means being coupled to said second input of said multiplexing means.

6. Scan line conversion apparatus as claimed in claim 4, wherein the received digital signal corresponds to a chrominance component of a composite color television signal having a luminance component and a modulated color subcarrier having at least two chrominance components.

* * * * *